United States Patent [19]

Shiraishi et al.

[11] Patent Number: 4,677,524
[45] Date of Patent: Jun. 30, 1987

[54] METALCLAD SWITCHGEAR HAVING SEPARATE ASSEMBLIES

[75] Inventors: Masazumi Shiraishi; Masaki Ikuta, both of Tokyo, Japan

[73] Assignee: Kabushiki Kaisha Toshiba, Kawasaki, Japan

[21] Appl. No.: 793,800

[22] Filed: Nov. 1, 1985

[30] Foreign Application Priority Data

Nov. 6, 1984 [JP]  Japan ................... 59-232301

[51] Int. Cl.⁴ .......................... H02B 13/06
[52] U.S. Cl. ................... 361/335; 200/50 AA; 200/307; 361/394
[58] Field of Search ........... 361/331, 332, 333, 334, 361/335, 336, 337, 338, 339, 340, 341, 342, 343, 344, 345, 394; 200/50 AA, 307, 50 R, 50 A, 50 C

[56] References Cited

U.S. PATENT DOCUMENTS 3,398,327  8/1968  Ferris ................ 200/50 AA
3,900,712  8/1975  Fukao ................ 200/307

FOREIGN PATENT DOCUMENTS 1173034  12/1969  United Kingdom ........... 200/307

OTHER PUBLICATIONS

General Electric's Power/Vac Metalclad Switchgear, GEA-10049, May 1977.

Primary Examiner—A. D. Pellinen
Assistant Examiner—Morris Ginsburg
Attorney, Agent, or Firm—Oblon, Fisher, Spivak, McClelland & Maier

[57] ABSTRACT

A metalclad switchgear has three assemblies which are separately arranged in separate housings for housing a circuit breaker, a control line and a cable, all constituting the metalclad switchgear and which can be detachably coupled. The three assemblies are a circuit interrupting device, which can be designed for standardization, and a control line compartment and a cable compartment both of which can be designed in accordance with given specifications.

4 Claims, 12 Drawing Figures

F I G. 9A
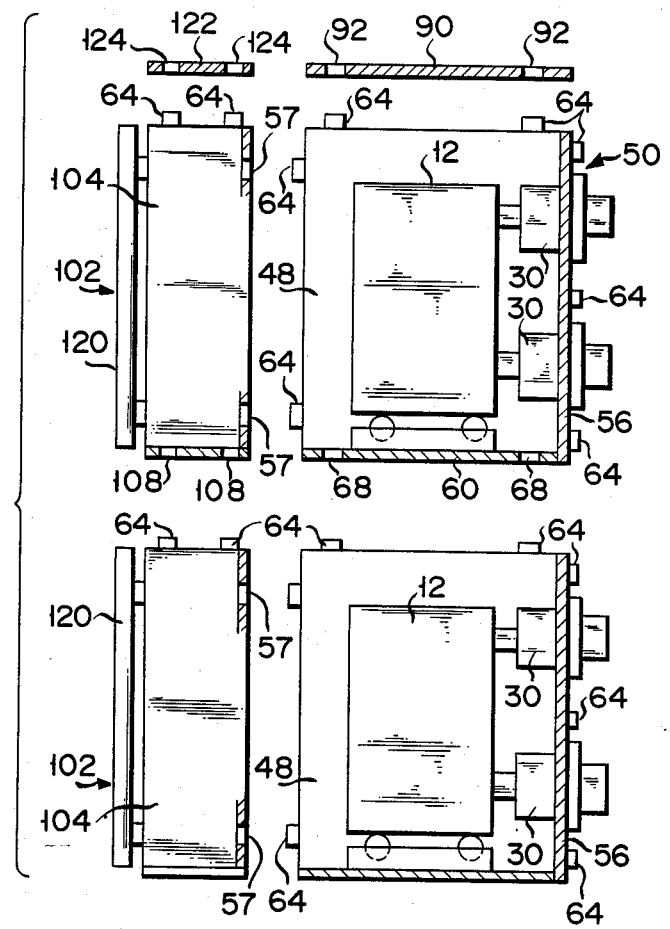

F I G. 9B
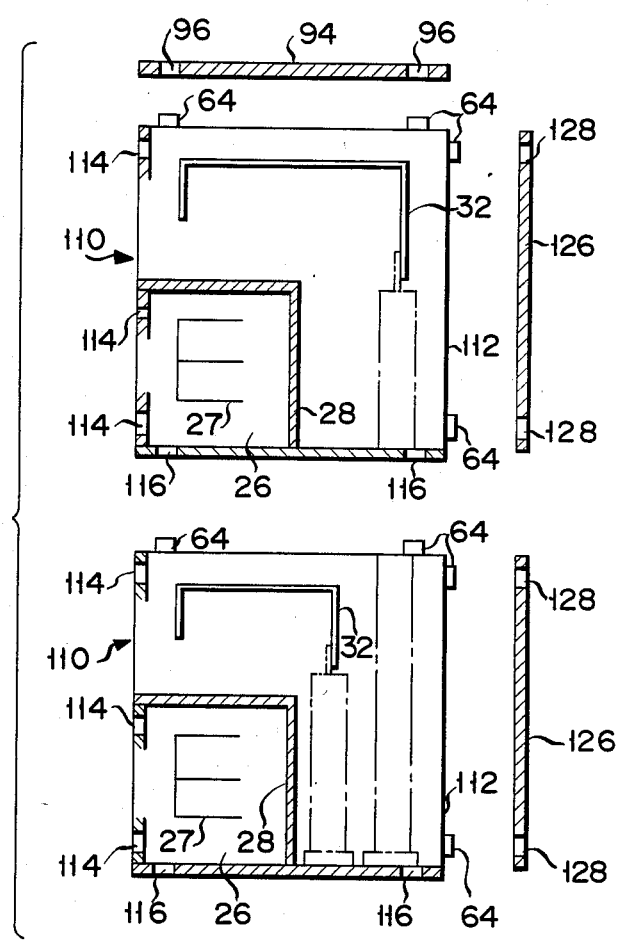

METALCLAD SWITCHGEAR HAVING SEPARATE ASSEMBLIES

BACKGROUND OF THE INVENTION

The present invention relates to a metalclad switchgear having at least one circuit breaker and equipment cooperating with each circuit breaker, and to a circuit interrupting device for housing the circuit breaker.

A metalclad switchgear of the type described above is already known. In a typical structure of the metalclad switchgear, the circuit breaker and the cooperating equipment are housed in a single closed box, and the position of the cooperating equipment in the closed box is determined by the position of the circuit breaker as main equipment. FIGS. 1 and 2 are schematic views showing typical structures of conventional three-phase metalclad switchgears. The three-phase metalclad switchgear in FIG. 2 has a configuration of circuit breakers and cooperating equipment in two vertical stages so as to save floor space.

In the metalclad switchgear in FIG. 1 or 2, circuit breaker 12, 12a and 12b are located at a side of a door 36 or 36a and 36b so as to provide access to a single closed box 14 and 15. The closed box 14 is partitioned by a partition plate 16 into a circuit breaker compartment 18 and a cable compartment 20. A control line compartment 24 is formed above the circuit breaker compartment 18 through a partition wall 22 to protect a low-voltage control line (not shown) for controlling the circuit breaker 12 from a high-voltage section in the metalclad switchgear. A partition wall 28 is formed below the cable compartment 20 to form a bus compartment 26. The bus compartment 26 serves to shield a bus (not shown) arranged therein and a bus support conductor 27 for carrying the bus. Main circuit disconnecting devices 30 are mounted on the partition plate 16 opposite to output terminals of the circuit breaker 12. A power source side terminal of one main circuit disconnecting device 30 is connected to the bus support member 27 and an output side terminal of the other main circuit disconnecting device 30 is connected to a load cable 34 through a connecting conductor 32. Only electrical connections for one of the three phases are illustrated. The door 36 which can be opened/closed is arranged in front of the circuit breaker compartment 18, and a door 35 which can be opened/closed is arranged in front of the control line compartment 24. A ceiling plate 40 is disposed at a ceiling section, and a detachable cover 42 is arranged behind the cable compartment 20. A floor plate 44 is mounted below the closed box 14. A guide plate 46 is mounted on the floor plate 44 to guide the circuit breaker 12 upon insertion/removal thereof with respect to the closed box 14.

FIG. 2 shows a metalclad switchgear wherein circuit breakers and their cooperating equipment are housed in two stages in a single closed box 15. The metalclad switchgear of FIG. 2 is substantially the same as the structure obtained by vertically stacking two metalclad switchgears of FIG. 1 except that control line compartments 24a and 24b are arranged in front of circuit breaker compartments 18a and 18b to decrease the height of the closed box 15 in consideration of operability of a circuit breaker 12b. The circuit breaker compartments 18a and 18b and cable compartments 20a and 20b which are respectively partitioned by partition plates 16a and 16b are formed in the interior of the single closed box 15 which houses the entire structure of the metalclad switchgears of FIG. 2. The control line compartments 24a and 24b are formed on sides of the surface portions of the front portions of the circuit breaker compartments 18a and 18b at positions which do not interrupt access to the circuit breakers 12a and 12b. The control line compartments 24a and 24b are partitioned by partition plates. Bus compartments 26a and 26b are formed by partition walls 22a and 22b in the cable compartments 20a and 20b, and bus support conductors 27a and 27b are shielded by partition walls 22a and 22b, respectively. Main circuit disconnecting devices 30a and 30b are mounted on the partition plates 16a and 16b opposite to the terminals of the circuit breakers 12a and 12b. The power source side terminals of the main circuit disconnecting devices 30a and 30b are connected to bus support conductors 27a and 27b, respectively. The output side terminals of the devices 30a and 30b are connected to load cables 34a and 34b through connecting conductors 32a and 32b respectively.

Doors 36a and 36b which can be opened/closed are mounted at the front portions of the control line compartments 24a and 24b, a ceiling plate 40a is mounted on a ceiling section, and detachable covers 42a and 42b are mounted in the rear portions of the cable compartments 20a and 20b, respectively. Furthermore, a floor plate 44a is mounted in the lower portion of the closed box 15, and a floor plate 44b is mounted in the intermediate portion. Guide plates 46a and 46b are mounted on the floor plates 44a and 44b to guide the circuit breakers 12a and 12b upon insertion/removal thereof with respect to the box 15.

As can be apparent from the structures of FIGS. 1 and 2, even if the circuit breakers of identical ratings are used, the metalclad switchgears of FIGS. 1 and 2 are entirely different from each other. Therefore, circuit design and fabrication of the switchgear of FIG. 1 are entirely different from those of FIG. 2. In particular, when the type and model of cooperating equipment for the circuit breakers in the switchgears vary in every manufacturing process (the variation often depends on customer requirements), design cannot be started until the specification details of cooperating equipment are determined although the identical circuit breakers are used. As a result, the actual manufacturing time during the entire period from the placement of an order to the delivery of the metalclad switchgear is substantially short, resulting in inconvenience. The types and numbers of jigs and tools required for manufacturing metalclad switchgears of different shapes and dimensions are increased, and the management thereof becomes cumbersome. Furthermore, when a circuit breaker has high ratings, the metalclad switchgear becomes bulky, and transportation and installation as well as manufacture require greater skills.

When a failure occurs in a metalclad switchgear and even if a failure occurs in one of the spaces i.e, compartments partitioned by the partition plates in the metalclad switchgear, the closed box must be replaced since it cannot be divided into parts. Therefore, the time from power failure until recovery is prolonged, and the power supply of the adjacent metalclad switchgear is interfered with.

SUMMARY OF THE INVENTION

It is an object of the present invention to provide a metalclad switchgear and a circuit interrupting device used in the metalclad switchgear wherein design and manufacturing times can be shortened, transportion and installation can be simplified, and repair and replacement of a failure portion can be easily performed even if a failure occurs.

In order to achieve the above object of the present invention, there is provided a metalclad switchgear having at least one circuit breaker and equipment cooperating with each circuit breaker, wherein at least one circuit breaker and the cooperating equipment are formed by a plurality of assemblies which are arranged adjacent to each other and detachable from each other, the assemblies including a circuit interrupting device which houses at least one circuit breaker therein and a plurality of cooperating units which house the cooperating equipment in a divided manner, a coupling means is provided to detachably couple the adjacent assemblies, and the circuit interrupting device is arranged such that a housing thereof and a housing of cooperating units for housing cooperating equipment are detachably coupled through the coupling means.

The advantages of the metalclad switchgear of the present invention will be summarized as follows. In the metalclad switchgear of the present invention, concerning the circuit interrupting device and at least one cooperating unit, the circuit interrupting device can be standardized, so that design and manufacture can be performed within a short period of time, resulting in low cost. Furthermore when a failure occurs in the metal-clad switchgear, i.e., a failed unit, the corresponding circuit interrupting device and the cooperating unit separated from the circuit interrupting device can be repaired or replaced with new one, so that repair or maintenance operations can be simplified and require only a short period of time. Therefore, the downtime due to a failure can be shortened. The circuit interrupting device of the present invention is structured as an assembly required for constituting the metalclad switchgear of the present invention.

BRIEF DESCRIPTION OF THE DRAWINGS

FIG. 9A is a side view of a separated front portion of a double stacking type metalclad switchgear;

FIG. 9B is a side view of a separated rear portion of the double stacking type metalclad switchgear of FIG. 9A;

DETAILED DESCRIPTION OF THE PREFERRED EMBODIMENT

Figure 3:
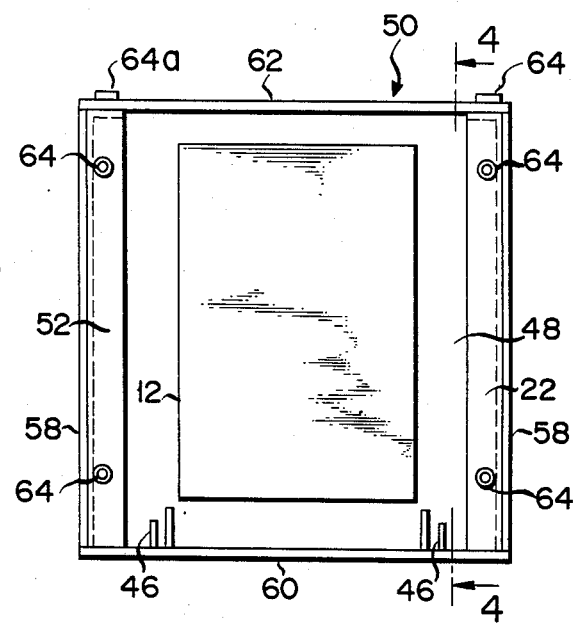
FIG. 3 is a front view showing the main part of a metalcald switchgear according to an embodiment of the present invention.
Figure 4:
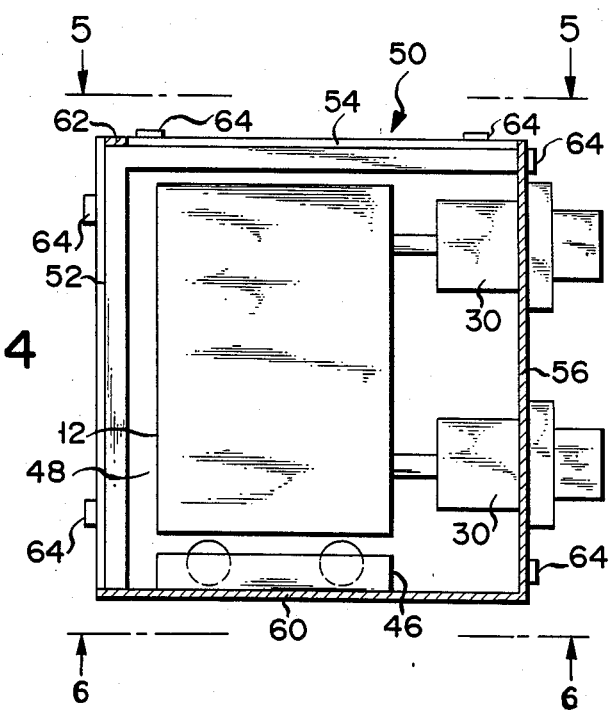
FIG. 4 is a view of a circuit interrupting device taken along the line 4—4 of FIG. 3.
Figure 5:
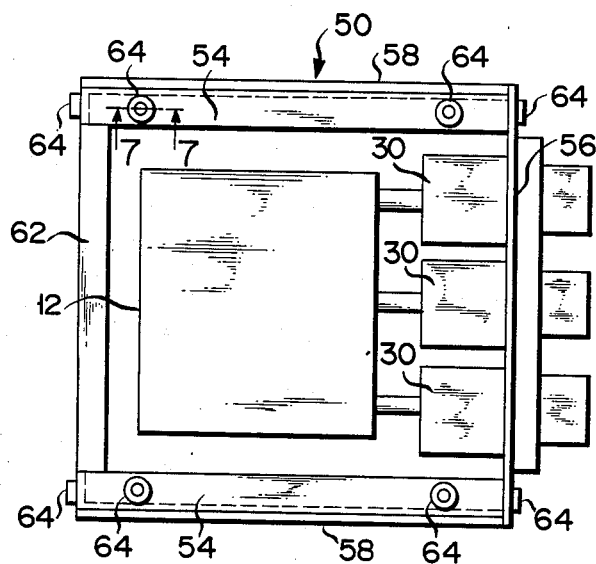
FIG. 5 is a sectional view of the circuit interrupting device taken along the line 5—5 of FIG. 4.
Figure 7:
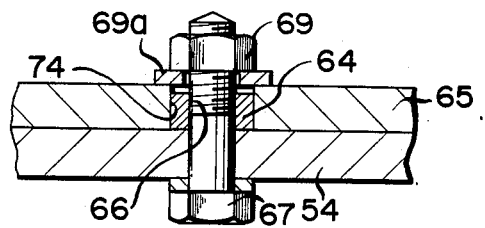
FIG. 7 is a sectional view of a projection taken along the line 7—7 of FIG. 5.

An embodiment of the present invention will be described in detail. A circuit interrupting device 50 shown in FIGS. 3, 4 and 5 comprises a three-phase circuit breaker (to be referred to as a circuit breaker hereinafter) 12, a hgusing 48 for detachably housing the circuit breaker 12, and a main circuit disconnecting device 30 provided within the housing 48. The housing 48 integrally comprises: front frames 52 arranged at the right and left front sides, i.e., the sides facing frontward in FIG. 3; ceiling frames 54; a partition plate 56 arranged at the rear side, i.e., the right side of FIG. 4 and having the main circuit disconnecting device 30 mounted thereon and connected with the circuit breaker 12; side plates 58 arranged at two sides of FIG. 3; a floor plate 60; and a connecting plate 62 for connecting the front sides of the ceiling frames 54 by welding or screw engagement. Cylindrical projections 64 are formed on the upper side surfaces of the front and rear sides of the ceiling frames 54. FIG. 7 shows the ceiling frame 54 and the projection 64 formed thereon. The height of the projection 64 is shorter than the thickness of members coupled to the projection 64. The member coupled to the projections are exemplified by a floor plate 65, which is part of a housing 72 of a control line compartment 70 (described below). A through hole 66 is formed in the projection 64 and the ceiling frame 54 to extend along the axis of the projection 64. In order to couple the floor plate 65 to the ceiling frame 54, the projection 64 is inserted in a hole 74 formed in the floor plate 65 and the ceiling frame 54 is overlayed by the floor plate 65. A screw 67 is inserted through the hole 66 and a nut 69 is threadably engaged with a projecting end of a screw 67 through a proper washer 69a and is thus fastened.

Figure 6:
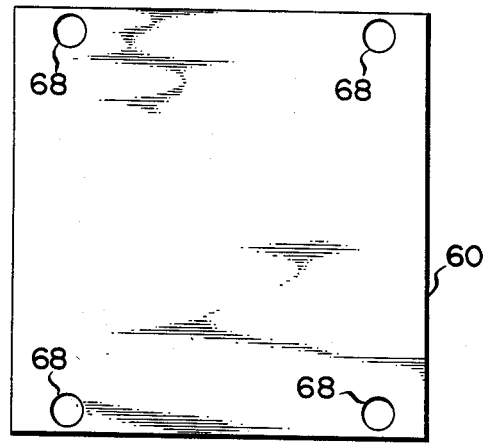
FIG. 6 is a view of the metalclad switchgear taken along the line 6—6 of FIG. 4.

The projections 64 each having the structure described above are formed at the upper and lower portions of the front frame 52 and the upper and lower portions of the two sides of the partition plate 56 in addition to the ceiling frame 54 described above. Holes 68 to be engaged with the corresponding projections 64 shown in FIG. 7 are formed also at the front and rear portions of the two sides of the floor plate 60 of the housing 48, as shown in FIG. 6. The holes 68 are located at positions corresponding to the projections 64 of the ceiling frame 54 and are used to stack the circuit interrupting devices (50 FIG. 9A) and a control line compartment 70 (FIG. 8A) to be described later. A connector (not shown) is arranged in the circuit breaker 12 to connect a control line 71 to the circuit breaker 12 so as to control the circuit breaker 12.

Figure 8:
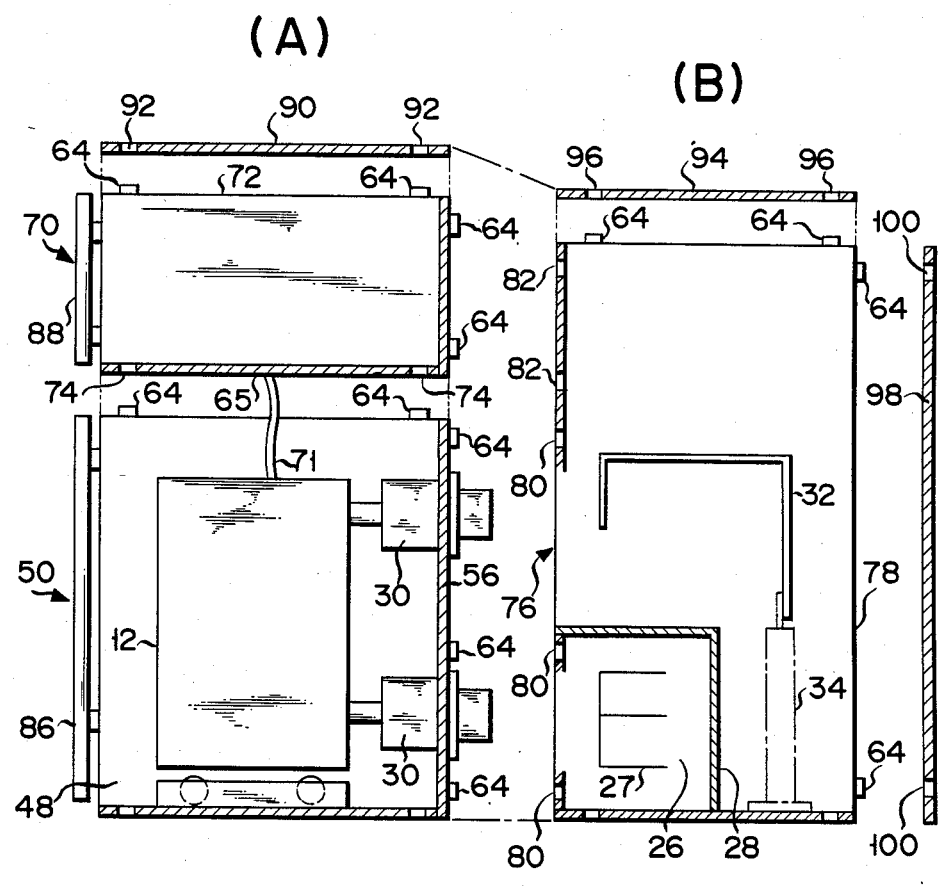
FIG. 8 is a side view showing separated assemblies of the metalclad switchgear.

A double stacking type metalclad switchgear using the circuit interrupting device 50 described above will be explained with reference to FIG. 8 and FIGS. 9A and 9B. The (A) portion of FIG. 8 shows the circuit interrupting device 50, a control line compartment 70 located above the device 50 and coupled thereto, and a ceiling plate 90 mounted to the upper surface of the compartment 70. More particularly, the (A) portion shows that the device 50, the compartment 70.and the plate 90 are vertically separated. The (B) portion of FIG. 8 shows that a cable compartment 76 to be coupled to the control line compartment 70 and the circuit interrupting device 50, and a ceiling plate 94 to be mounted on the upper surface of the compartment 76 are vertically separated. The members of the (A) and (B) portions of FIG. 8 are vertically coupled, and the coupled assemblies are horizontally coupled to prepare a single metalclad switchgear. Therefore, the circuit interrupting device 50, the control line compartment 70 and the cable compartment 76 are three assemblies constituting the single metalclad switchgear.

Figure 1:
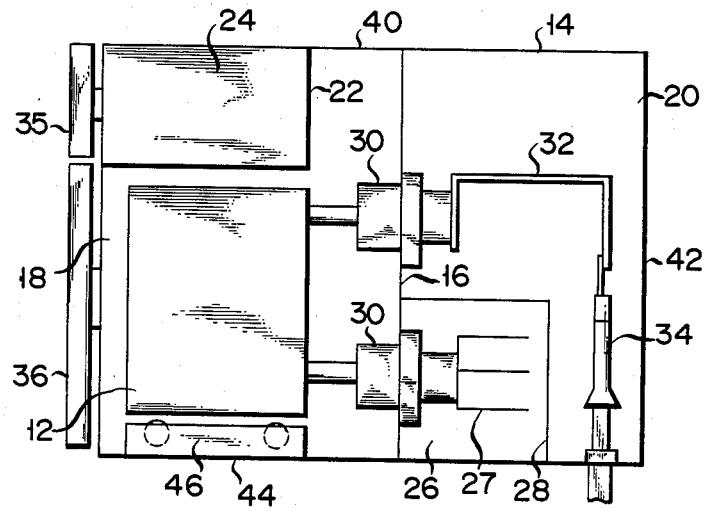
FIG. 1 is a side view showing a structure of a conventional metalclad switchgear.
Figure 2:
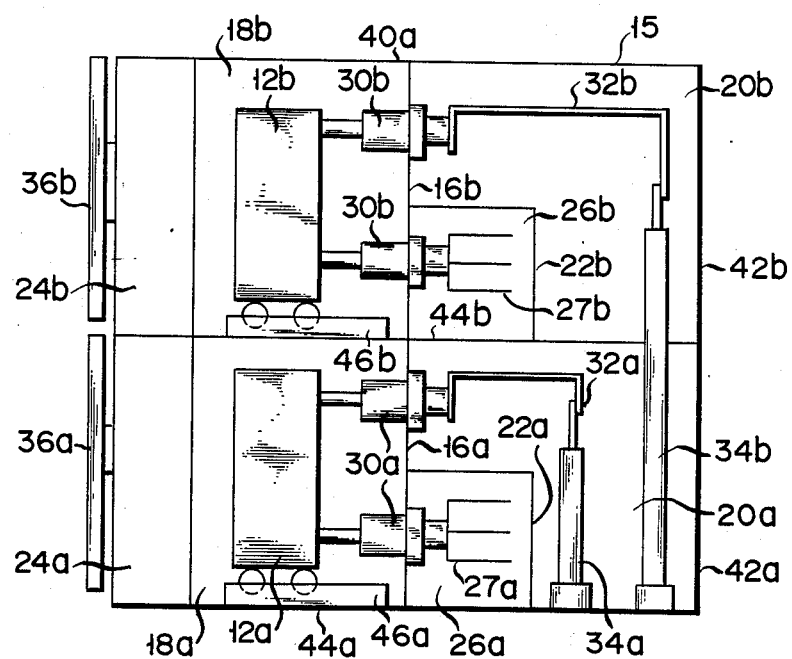
FIG. 2 is a side view showing the structure of a conventional double stacking type conventional metalclad switchgear.

The control line compartment 70 serves to shield the control line 71 from the high-voltage section. The control line 71 is used in a low-voltage circuit for controlling the circuit breaker 12. The cable compartment 76 houses the same members 32, 34, 27 and 28 as those in the cable compartment 20 of FIG. 1, and these members connect two terminals of the circuit breaker 12 to the bus and load cables 34.

Referring to FIG. 8, the control line compartment 70 is coupled to the upper portion of the circuit interrupting device 50. The width and length of the compartment 70 are the same as those of the housing 48, and the height of the compartment 70 can be designed as needed. The control line compartment 70 comprises a housing 72 with the front, ceiling, bottom, side and rear plates in the same manner as in the housing 48. Projections 64 are formed in the partition plate and the ceiling frame and the projections 64 of the ceiling frame are inserted through holes 74 in the floor plate of the housing 72. The cable compartment 76 is coupled to the rear portion of the circuit interrupting device 50. A housing 78 of the cable compartment 76 has substantially the same width as that of the housing 48 and the same height as a sum of heights of the housings 48 and 72. The length of the compartment 76 is determined as needed. The housing 78 comprises the front, ceiling, floor, side and rear frames substantially in the same manner as in the housing 48. Holes 80 and 82 are formed in the front frame of the housing 78. The holes 80 can be engaged with the projections 64 formed on the partition plate 56 of the housing 48. The holes 82 can be engaged with the projections 64 on the partition plate of the housing 72. The projections 64 are formed on the rear and ceiling frames. Holes are formed in the floor plate of the housing 78 at positions corresponding to the projections 64 of the ceiling frame. A bus compartment 26 shielded by the partition wall 28 is formed in the housing 78. The circuit interrupting device 50 is connected to the control line compartment 70 in the following manner. The projections 64 formed on the ceiling frame 54 (FIG. 5) of the circuit interrupting device 50 are inserted in the corresponding holes 74 formed in the floor plate of the control line compartment 70, and screws 67 are inserted in the holes 66 and are fastened by nuts 69, as shown in FIG. 7. The circuit breaker 12 in the housing 48 is connected to a control line (not shown) in the control compartment 70 through the connector (not shown) as previously described. In the cable compartment 76, the projections 64 formed on the circuit interrupt device 50 are inserted in the corresponding holes 80 formed in the cable compartment 76, and the projections 64 on the control line compartment 70 are inserted in the corresponding holes 82 formed in the cable compartment 76. As shown in FIG. 8, the circuit interrupting device 50 is coupled to the control line compartment 70. A bus support conductor 27 and a connecting conductor 32 are connected to the circuit disconnecting devices 30 connected to the power source and load terminals of the breaker 12. A door 86 which can be opened/closed is mounted in front of the device 50 by using proper hinges (not shown) and the projections 64. A door 88 is arranged in front of the compartment 70 in the same manner as in the door 86. A ceiling plate 90 is mounted in the same manner as in FIG. 7 such that the projections 64 on the control line compartment 70 are inserted in corresponding holes 92 of the ceiling plate 90. The ceiling plate 94 is mounted on the cable compartment 76 in the same manner as in FIG. 7 such that the projections 64 on the cable compartment 76 are inserted in corresponding holes 96 formed in the ceiling plate 94. A rear plate 98 is mounted on the rear surface of the cable compartment 76 in the same manner as in FIG. 7 such that the projections 64 on the cable compartment 76 are inserted in corresponding holes 100 of the rear plate 98.

The structure of a double stacking type metalclad switchgear having two vertically stacked circuit interrupting devices 50 will be described with reference to FIGS. 9A and 9B.

FIG. 9A shows a state wherein two circuit interrupting devices 50, two control line compartments 102 and ceiling plates 122 and 90 are vertically separated. FIG. 9B shows a state wherein two cable compartments 110, two rear plates 126 mounted on the rear sides of the cable compartments 110, and a ceiling plate 94 mounted on the upper cable compartment 110 are vertically separated. An assembly obtained by integrally coupling the respective members of FIG. 9A and an assembly obtained by coupling the respective members of FIG. 9B are coupled to constitute the double stacking type metalclad switchgear such that the right end portion of the upper device 50 is coupled to the left end of the upper cable compartment 110, and the right end of the lower device 50 is coupled to the left end of the lower cable compartment 110.

As shown in FIG. 9A and 9B, the control line compartment 102 is mounted in front of each circuit interrupting device 50. A housing 104 of the compartment 102 has substantially the same width and height as those of the housing 48 of the device 50. The depth of the housing 104 is arbitrarily determined. The control line compartment 102 comprises front, ceiling, floor, side and rear frames in the same manner as in the housing 48. The housing 104 is arranged in the proper position at the front end (the left end of FIG. 9A) of the circuit interrupting device 50 so as not to prevent insertion/removal of the device 50 with respect to the front side. Holes 57 are formed in the rear frame of the housing 104 and can be engaged with the projections 64 formed on the front frame 52 (FIG. 3) of the housing 48. Holes 124 are formed in a ceiling plate 122 on the control line compartment 102. A control line (not shown) in the compartment 102 is coupled to the circuit breaker 12 through a connector (not shown). The cable compartment 110 is coupled to the rear side of the device 50. A housing 112 in the compartment 110 has the same width and height as those of the housing 48, and the length of the housing 112 can be arbitrarily determined. The housing 112 comprises front, ceiling, floor, side and rear frames in the same manner as in the housing 48. Holes 114 are formed in the front frame of the housing 112 and can be engaged with the corresponding projections 64 formed in the partition plate 56 of the housing 48. Holes 116 formed in the floor plate of the upper cable compartment 110 are engaged with the projections 64 formed on the ceiling frame of the lower cable compartment 110. Projections 64 are also formed on the rear and ceiling frames. A bus compartment 26 partitioned by a partition wall 28 is formed in the housing 112. The bus support conductor 27 and the connecting conductor 32 are connected to the main circuit disconnecting device 30.

A method of coupling the circuit interrupting device 50, the control line compartment 102 and the cable compartment 110 will be described hereinafter. The two circuit interrupting devices 50 are vertically stacked, the upper projections 64 of the lower device 50 are inserted in the corresponding holes 68 of the floor plate of the upper device 50, and screws 67 are inserted in the holes 66 and engaged with nuts 69, in the same manner as in FIG. 7. Similarly, the two control line compartments 102 and two cable compartments 110 are vertically stacked. The projections 64 of the lower control line compartment 102 are inserted in corresponding holes 108 of the upper control line compartment 102, and the projections 64 of the lower cable compartment 110 are inserted in the corresponding holes 116 of the upper cable compartment 110. The compartments are coupled in the same manner as in FIG. 7. The vertically connected compartments 102 are coupled to the vertically connected devices 50, and the vertically connected compartments 110 are coupled to the rear side of the assembly of the devices 50. The projections 64 extending from the front and rear surfaces of the devices 50 are engaged with the holes 57 and 114 formed in the compartments 102 and 110, and connections are performed in the same manner as in FIG. 7. After the above operation is completed, doors 120 are mounted at the front sides of the control line compartments 102, in the same manner as in FIG. 8A, so that they can be opened/closed. The ceiling plate 90 is mounted on the upper surface of the upper circuit interrupting device 50, and the ceiling plate 94 is mounted on the upper surface of the upper cable compartment 110. Furthermore, the ceiling plate 122 is mounted in the upper surface of the upper control line compartment 102 in the same manner as in FIG. 7. The holes used for mounting the ceiling plates 122, 90 and 94 are represented by reference numerals 124, 92 and 96. The rear plate 126 is mounted on the rear surface of each cable compartment 110. The projections 64 formed on the compartment 110 are engaged with the holes 128 formed in the rear plate 126, and connections therebetween are performed by using the screws 67 and the nuts 69 in the same manner as in FIG. 7.

Advantages of use of the metalclad switchgear of the present invention will be described in more detail.

With the above construction, the circuit interrupting devices can be standardized in accordance with different ratings, and the cooperating units which cooperate with the standardized interrupting device and which are designed in accordance with various customer needs can be designed separately from the circuit interrupting devices. Since a large number of such standardized circuit interrupting devices are required, they can be standardized for mass production and can be manufactured in mass production lines. In this manner, when manufacturing lines are divided in accordance with the types of assemblies, production efficiency can be improved, and the manufacturing time can be shortened. Other advantages of the construction described above are given as follows. Even if specification modifications are requested upon completion of manufacturing, such modifications can be often achieved by partial modification of separate assemblies to be coupled to constitute the metalclad switchgear.

Separate assemblies can be coupled such that the projections 64 are inserted in the corresponding holes and are fastened by screws. Therefore, design can be made to provide sufficient mechanical strength to the coupling portions. In addition, the coupling holes can be utilized for suspending the separate assemblies during assembly operation and transportation.

When the metalclad switchgears of the present invention are aligned in the right-and-left direction while the surfaces thereof are aligned along one direction, even if a failure occurs in one of the switchgears and the failed device 50 is removed, power failure can be limited substantially to the failed metalclad switchgear. The operation for obtaining the above advantages will be described in detail with reference to FIGS. 10 and 11.

Figure 10:
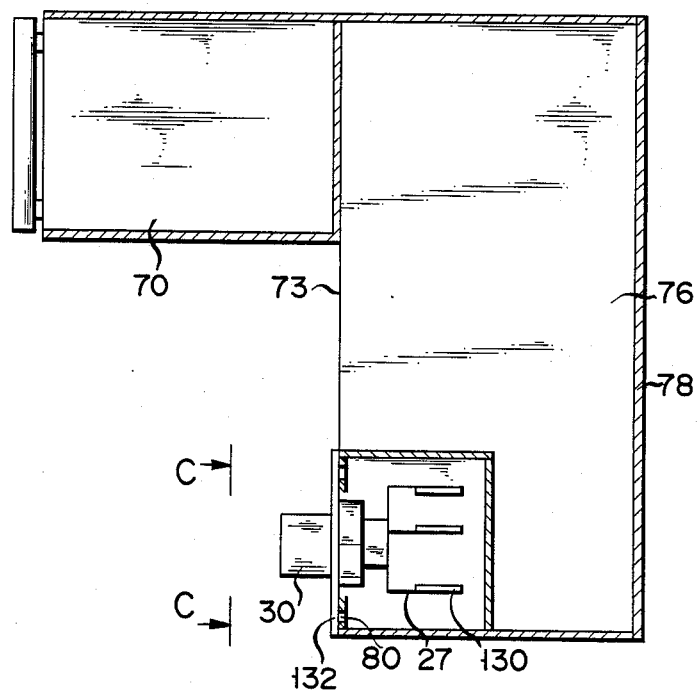
FIG. 10 is a side view showing the main part of the metalclad switchgear from which the circuit interrupting device is removed.
Figure 11:
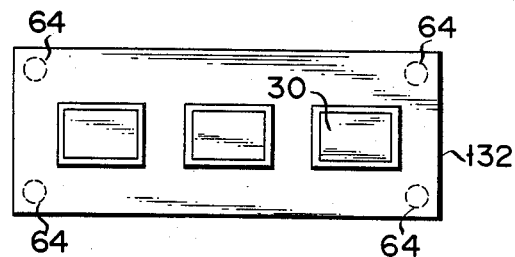
FIG. 11 is a view of a lower portion of the metal-clad switchgear taken along the line C—C of FIG. 10.

FIG. 10 shows a case wherein a failure occurs in the circuit interrupting device 50 in the metalclad switchgear of FIG. 8. In this case, the failed circuit interrupting device 50 is removed together with the main circuit disconnecting device connected thereto and the corresponding bus support member. A fixing plate 132 mounted with the main circuit disconnecting device 30 and the bus support member 27 is mounted on the front frame of the housing 78 of the cable compartment 76. A bus 130 can be properly supported by the bus support member 27 in the same manner as before the failure occurs. The adjacent metalclad switchgears connected to the bus can be operated safely. Therefore, inconvenience caused by the power failure can be limited to the range of loads connected to the failed metalclad switchgear. When a repaired or new circuit interrupting device can be prepared in place of the failed circuit interrupting device, the main circuit disconnecting device 30 and the fixing plate 132 are removed, and the circuit interrupting device 50 can be coupled to the control line compartment 70, thereby electrically connecting the circuit interrupting device and hence completing restoration of the metalclad switchgear. The above description has been made with a single stacking type metalclad switchgear. However, substantially the same restoration operation can be performed even if a failure occurs in a double stacking type metalclad switchgear. The fixing plate 132 is mounted on the front frame of the housing 78 such that the projections 64 (not shown) on the fixing plate 132 are inserted in the holes 80 formed in the front frame and connections are made in the same manner as in FIG. 7.

Even if a failure occurs in the cooperating unit besides the circuit interrupting device 50, the failed unit can be replaced with a repaired or new one. As a result, the power failure time can be shortened.

In the above description, the projections 64 extending on one member to be coupled are inserted in the corresponding holes of the other member, and these members are coupled by using the screws 67 and the nuts 69 as shown in FIG. 7. However, the coupling method is not limited to this, but various conventional methods can be utilized. For example, the hole 66 in FIG. 7 may be replaced with a screw hole, and the screw 67 may be threadably engaged with the corresponding screw hole.

The circuit interrupting device can be used as the most important assembly for constituting the metalclad switchgear of the present invention.

What is claimed is:

1. A metalclad switchgear comprising at least one circuit breaker and means for cooperating with each said at least one circuit breaker, said each circuit breaker and corresponding ones of said cooperating means comprising a plurality of separate assemblies which are arranged adjacent to each other and are detachably coupled to each other, said plurality of separate assemblies including circuit interrupting means for housing said circuit breaker therein and a plurality of cooperating units for separately housing said cooperating means, said circuit interrupping means being coupled with said plurality of cooperating units by a plurality of coupling means.

2. A switchgear according to claim 1, wherein said cooperating units include a control line compartment for housing a control line for supplying an electrical signal to said circuit breaker and a cable compartment for housing a cable connected to said circuit breaker.

3. A switchgear according to claim 2, wherein said circuit interrupting means comprises one circuit interrupting device, and said coupling means connects said control line compartment onto said one circuit interrupting device and substantially horizontally connects said cable compartment to said control line compartment and said one circuit interrupting device which are connected to each other.

4. A switchgear according to claim 2, wherein said switchgear comprises a multi-stage metaclad switchgear in which said circuit interrupting means comprises a plurality of circuit interrupting devices, and wherein said coupling means includes means for vertically coupling a plurality of said control line compartments, means for vertically coupling a plurality of said circuit interrupting devices and means for vertically coupling a plurality of said cable compartments, and means for substantially horizontally coupling said vertically coupled control line compartments, the vertically coupled cicuit interrupting devices and the vertically coupled cable compartments.

* * * * *